POWER SUPPLY INTERLOCK SYSTEM
Filed Oct. 26, 1948
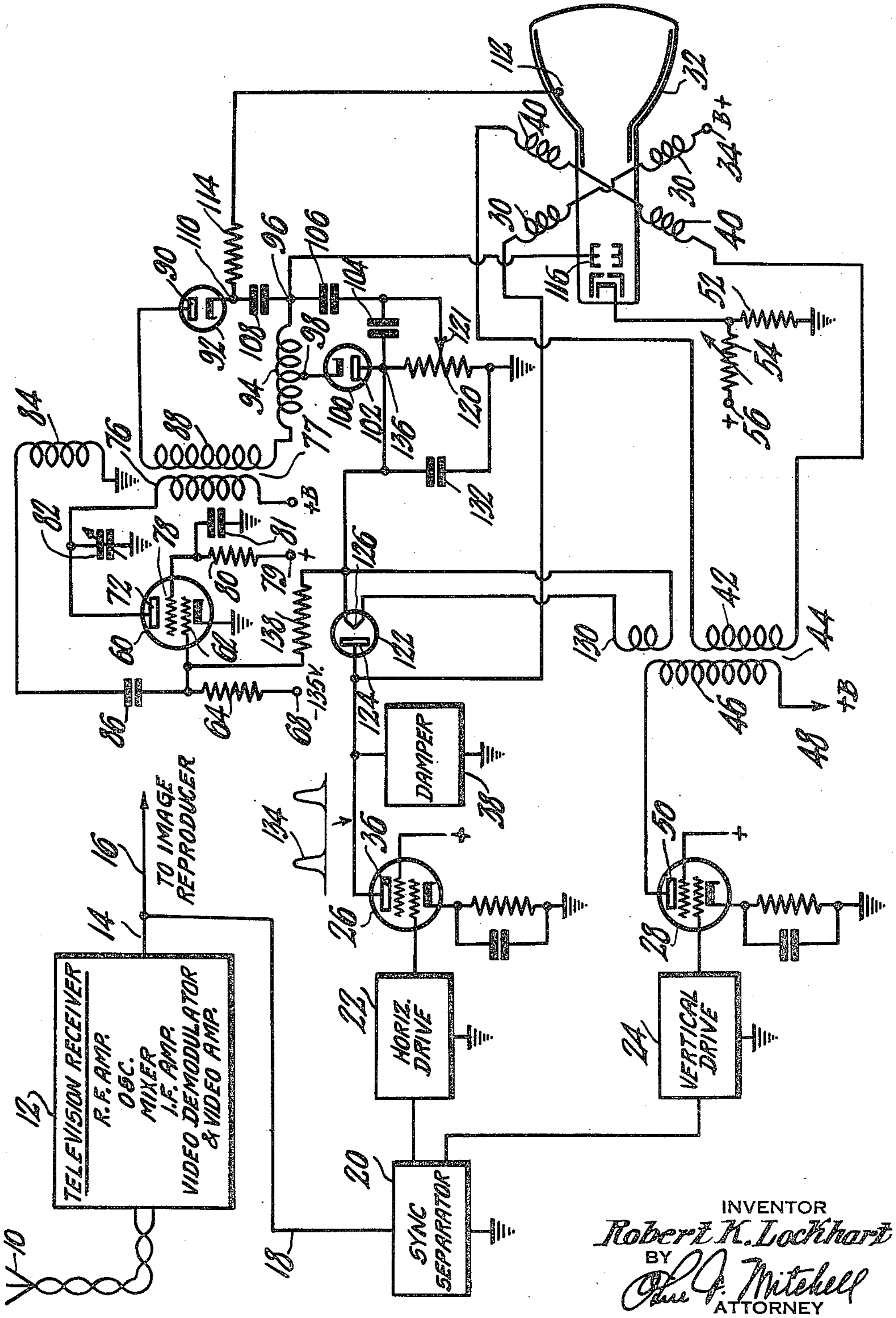
INVENTOR
Robert K. Lockhart
BY
Paul J. Mitchell
ATTORNEY Patented July 4, 1950 2,514,079

UNITED STATES PATENT OFFICE 2,514,079

POWER SUPPLY INTERLOCK SYSTEM

Robert K. Lockhart, Collingswood, N. J., assignor to Radio Corporation of America, a corporation of Delaware Application October 26, 1948, Serial No. 56,634

17 Claims. (Cl. 315—20)

The present invention relates to automatic interlocking systems for power supplies and deals more directly, although not necessarily limited, to an interlocking system between high voltage power supplies and deflection signal circuits in cathode ray tube systems.

More particularly, the present invention provides a disabling system for high voltage cathode ray tube power supplies which is actuated by characteristics of the deflection circuits associated with the cathode ray tube whereby failure of the deflection circuits automatically disables the high voltage power supply in order to protect the cathode ray device from the effects of undeflected high intensity electron beams.

As the electronic art progresses, use is being made of cathode ray equipment employing electron beam intensities of progressively higher values. This trend is readily detectable in the television field where the rapid development of projection television is demanding cathode ray image reproducing device capable of reproducing images of very high light intensity and this in turn requiring correspondingly greater beam intensities. As is well known to those skilled in the art cathode ray tubes particularly of the image reproducing variety having a fluorescent screen, must be operated with extreme caution so that at no time is a high intensity electron beam allowed to remain at a stationary position on the fluorescent screen inasmuch as irreparable damage may be incurred by the screen due to such severe electron bombardment. Consequently, in television receiving systems, it is sometimes deemed desirable to provide an interlocking system between the high voltage generator supplying beam accelerating potential for the cathode ray reproducing device and the deflection circuits which normally maintain the beam in constant motion, such that should there be a failure in the beam deflection system, the high voltage generator will be disabled either wholly or in part such to reduce the intensity of the electron beam on the fluorescent screen and thereby protect the screen from permanent damage.

The present invention provides a simple and economical method of realizing such an interlocking action between the horizontal and vertical deflection circuit systems and high voltage generating mechanisms as may be found in television equipment and finds particular application in television receivers having a radio frequency type of voltage doubling power supply adapted to provide well-regulated focusing and beam accelerating potential for the cathode ray tube.

It is therefore a purpose of the present invention to provide an improved form of protective interlocking system between a high voltage beam accelerating and focusing potential generator for a cathode ray reproducing device and associated beam deflection circuits.

It is further a purpose of the present invention to provide a cathode ray deflection circuit and high voltage generating circuit interlocking system which allows certain circuit economies to be realized with attendant improvements in circuit performance as well as providing interlocked protection for associated cathode ray equipment.

The novel features which are believed to be characteristic of the present invention are set forth in the appended claims. The invention itself, however, as to both its organization and method of operation as well as other purposes and advantages other than those hereinbefore set forth will be best understood from the teachings of the following description, especially when considered in connection with the accompanying drawings wherein the single figure is one embodiment of the present invention as applied to a conventional television receiving circuit.

Referring now to the figure, there is shown a conventional television receiving circuit arrangement comprising an antenna 10, which intercepts radio frequency television image signals and applies them to the input of the television receiver R. F. amplifier indicated as being included among the receiving components depicted by block 12. Accordingly, the radio frequency signal is amplified and heterodyned by the oscillator mixer combination to produce an intermediate frequency which is in turn amplified and demodulated to provide a composite television signal including image and synchronizing information. The television signal after demodulation may then be amplified by the video amplifier also indicated in block 12 and the output made available at terminal 14 for modulation of an image reproducing device as indicated by arrow 16. Examples of typical circuit arrangements applicable to the operations depicted by block 12 are given in an article entitled "Television Receivers" by Anthony Wright appearing in the March 1947 issue of RCA Review. The composite signal is also conventionally applied by a circuit path such as 18 to a sync separating circuit 20 which extracts from the composite television signal the horizontal and vertical synchronizing signals and respectively applies them for timing of the horizontal and vertical drive circuits 22 and 24. The output of the horizontal and vertical drive circuits are in turn shown as being respectively applied to the vacuum tubes 26 and 28, which will be hereinafter considered as forming the respective output stages of the horizontal and vertical deflection signal generator circuits.

By way of example, the horiontal deflection signal generator output tube 26 is shown as directly connected to the horizontal deflection yoke winding 30 disposed for deflection of the electron beam in cathode ray image reproducing device 32. The yoke winding 30 is connected between a source of anode polarizing potential 34 and the anode 36 of the vaccum tube 26. A suitable horizontal damping circuit 38 is also provided and is shown as connected between the deflection yoke winding 30 and ground potential. The vertical deflection winding 40 is excited from the secondary winding 42 on the vertical deflection signal output transformer 44, the primary 46 of the vertical output transformer being connected in series with a source of anode polarizing potential 48 and the anode 50 of vertical deflection signal generator output tube 28. A simple form of brightness control for the cathode ray image reproducing tube 32 is illustrated by the inclusion of resistor 52 in the cathode to ground circuit of the cathode ray tube. By adjustment of variable resistor 54 connected with a source of positive potential 56, the voltage drop across resistor 52 is conventionally varied to provide control over the beam intensity in the cathode ray tube.

Focusing potential and accelerating electrode potential for the cathode ray tube 32 is provided in most part by a voltage doubling R. F. power supply circuit based upon oscillator tube 60. The grid 62 of the oscillator tube is connected through resistor 64 to a source of relatively large negative potential having a terminal shown at 68. This potential, by way of example, is assigned a value of −135 volts but may assume other values which are sufficient to cause plate current cut-off in the vacuum tube 60 in a manner hereinafter described. The anode 72 of the vacuum tube 60 receives its polarizing potential from terminal 74 through the tapped primary 76 of high tension radio frequency transformer 77 of a type well known to the art. The screen 78 is conventionally connected to a source of positive polarizing potential 79 through decoupling resistor 80 and is held substantially at A. C. ground potential by means of by-pass condenser 81. The variable capacitor 82, connected across the primary 76, is employed to adjust the operating frequency of the oscillator. The voltage induced in tickler coil 84 is applied through coupling capacitor 86 to the grid 62 in such phase as to maintain oscillation of the vacuum tube 60 under proper values of grid operating bias. One terminal of the high-tension secondary winding 88 of the R. F. transformer 77 is shown as connected to the anode 90 of rectifier tube 92 whereas the other terminal of the winding 88 is connected through tapped inductance 94 to the focusing potential output terminal 96. A portion of the inductance 94 included between the tap 98 and terminal 96 is shunted by a second rectifier diode 100 whose anode 102 is coupled with the focusing potential 96 through series capacitor 106. The focusing potential terminal 96 is also connected through capacitor 108 to the high voltage accelerating potential terminal 110 which is in turn connected with the accelerating anode 112 of the kinescope 32 through series filtering resistor 114. The potential for the focusing electrode 116 of the cathode ray tube, of course, is applied through a connection from terminal 96 to the electrode 116.

In the operation of the high voltage power supply, the series circuit comprising the high tension secondary winding 88, inductance 94, capacitor 108, and rectifier diode 92 is proportioned to resonate at a frequency somewhat near the frequency of oscillation of the vacuum tube 60. This means that oscillatory current will flow through the inductance 94 to some extent and therefore produce across the terminals 98 and 96 thereof an alternating voltage which may be rectified by rectifier diode 100 to cause the anode 102 to establish itself at some unidirectional potential having a negative polarity with respect to terminal 96. Since the anode 102 is connected with ground potential through a bleeder resistor 120, this will cause the terminal 96 to assume some positive potential with respect to ground and may be of a value suitable for application to the cathode ray tube focusing electrode 116. The potential for the accelerating anode 112, of course, is derived from the terminal 110 at the cathode of rectifier diode 92. The potential with respect to ground existing at terminal 110 is the sum of the potential existing at terminal 96 plus the potential developed across the capacitor 108 due to rectification of voltage by diode 92. As will be apparent from study of the circuit, the R. F. voltage induced in the secondary winding 88 and applied to the anode 90 of the rectifier 92 and to the cathode of the same through capacitor 108 and inductance 94 will cause the terminal 110 to assume a unidirectional potential of positive polarity with respect to terminal 96 and of a value approximately equal to the peak value of the R. F. signal applied between the anode 90 and the terminal 96. Thus, the potential to ground from terminal 110 will be at least the sum of the potential existing from ground to terminal 96, due in part to the action of the first described portion of the voltage doubling circuit, and the voltage between terminals 96 and 110 due to the action of the second described portion of the voltage doubling circuit. As discussed, this higher output voltage existing at terminal 110 may be of such a value to allow its use as a beam accelerating potential while the intermediate voltage available at terminal 96 may be of such a value to allow its use as a focusing electrode potential.

Considering now the conventional operation of only those circuit elements set forth in the description of the figure given thus far, it is clear that failure of the horizontal or vertical deflection signal generating system would in a conventional manner subject to abuse the fluorescent screen of the cathode ray tube 32.

According to the present invention, however, a third rectifying diode 122, having its anode 124 connected with the horizontal deflection signal generator tube 26 and having its heater 126 excited from energy derived from an auxiliary winding 130 on the vertical deflection signal output transformer 44, is connected for producing a unidirectional voltage across capacitor 132 which obtains from the positive pulses 134 appearing in the anode circuit of the vacuum tube 26. Thus, as long as the vertical deflection circuit is properly operated, the heater 126 of the diode 122 will be excited sufficiently for unilateral conduction of the diode. On the other hand, as long as the horizontal deflection circuit is properly operated the pulses 134 derived therefrom may, according to circuit design peculiarities, produce several thousand volts across capacitor 132, which is shown connected across bleeder resistor 120 to ground. Hence, terminal 136 in addition to being negative by several thousand volts with respect to terminal 96 due to the action of the rectifier tube 100 will also be maintained positive with respect to ground by several thousand volts due to energy derived from the horizontal deflection signal generator through rectifier diode 122. The positive potential appearing at terminal 136 is then connected through a dropping resistor 138 to the grid 62 of the vacuum tube 60. This resistor 138 cooperates with resistor 64 connected with —135 volts supplied at terminal 68 to produce a suitable operating potential for vacuum tube 60 only upon normal development of a positive potential across capacitor 132 through the agency of the diode 122. Consequently, should either the horizontal or vertical deflection circuit fail, the positive voltage across capacitor 132 will be immediately reduced and allow the voltage at the grid 62 of the vacuum tube 60 to become substantially more negative. This action tends to disable the high voltage generator and in the limit, plate current cut-off in the vacuum tube 60 totally disables the high voltage generator.

The protective action given to the cathode ray tube 32 in the particular embodiment shown is two-fold upon failure of either the horizontal or vertical deflection signal generator circuits. The first action obtains from the fact that the voltage across capacitor 132, upon failure of either of the deflection circuits, will drop rapidly and since this voltage is normally adjusted in value to constitute a substantial portion of the focusing electrode potential available at terminal 96, it is seen that the beam in the cathode ray tube 32 will rapidly be defocused and through this action, reduce the effective beam intensity on the cathode ray tube fluorescent screen. The second protective action naturally follows from the increased negative bias on the grid of the vacuum tube 60 disabling the high voltage R. F. generator which, of course, reduces both the beam accelerating potential and further reduces the focusing electrode potential.

Another particular advantage of the circuit shown in the figure resides in the fact that the conventional high voltage bleeder across the high voltage power supply itself, for purposes of obtaining voltage dividing action, may be eliminated in such a way as to provide improvement in the regulation of the potential applied to the focusing electrode. Adjustment of the focusing electrode potential is accomplished by the tap 121 on the bleeder resistor 120, without imposing any additional load on the high voltage power supply system. Adjustment of the focusing potential available at terminal 96 through tap 121 results from changing the value of positive potential, developed by means of the rectifier 122, that is inserted in series aiding with the voltage developed across condenser 106 by rectifier 100. Thus, any bleeder energy in resistor 120 comes solely from the horizontal deflection signal generating circuit and is of such a value as to have negligible effect on the operation thereof. The fact that the tap 121 may be normally operated toward the anode end of resistor 120 allows a reduction in the amount of series resistance in the focusing electrode circuit and consequently permits better regulation of the voltage supplied to the cathode ray focusing electrode.

It is to be noted that although the present invention has been shown in connection with a R. F. oscillator type of high voltage supply connected for voltage doubling operation and specific arrangements have been shown for extracting energy from the horizontal and vertical deflection circuits, the practice and utility of the present invention is in no way intended to be limited thereby. For example, the present invention, practiced in connection with a different form of high voltage power supply used for operation of a cathode ray tube requiring substantially smaller values of beam accelerating voltage and employing electromagnetic focusing, will provide protection for the cathode ray tube solely through the immediate reduction of beam accelerating potential upon failure of the associated beam deflection circuits.

What is claimed is:

1. In a cathode ray deflection system, a vertical deflection signal generator, a horizontal deflection signal generator, a high voltage generator employing a vacuum tube having at least a cathode and a control grid, said high voltage generator developing an output voltage of a magnitude dependent upon the proper operation of said vacuum tube, connections for applying the output of said high voltage generator for excitation of the cathode ray of said system, a voltage rectifying system connected with at least one of said deflection generators for producing a unidirectional potential in accordance with the deflection signals generated thereby, means coupling the unidirectional potential produced by said voltage rectifying system to the control grid cathode circuit of said high voltage generator vacuum tube whereby failure of at least one of said deflection generators will cause disabling of said high voltage generator through a change in unidirectional potential produced by said voltage rectifying system.

2. Apparatus according to claim 1 wherein said high voltage generator is of the radio frequency type and wherein there is additionally provided a negative bias supply connected with the control grid of said high voltage generator vacuum tube, said negative supply voltage being of sufficient magnitude to establish plate current cut-off in said vacuum tube and wherein said rectifying system unidirectional potential is coupled to the control grid cathode circuit of said high voltage generator vacuum tube with such polarity to oppose said negative bias supply voltage thereby establishing proper operating conduction of said vacuum tube only during the normal development of said unidirectional potential by said voltage rectifying system.

3. Apparatus as defined in claim 1 wherein said voltage rectifying system includes a heater type diode having an anode, and wherein there are additionally provided connections from said horizontal deflection signal generator to said diode anode for rectifying a portion of the waveform normally produced by said horizontal deflection signal generator, and connections from said diode heater to said vertical deflection signal generator to provide excitation of said heater from deflection signal energy normally produced by said vertical deflection signal generator.

4. Apparatus according to claim 1 wherein said high voltage generator is of the radio frequency type and wherein there is additionally provided a source of negative bias potential connected with said high voltage generator vacuum tube control grid, said negative bias potential being of sufficient magnitude to establish plate current cut-off in said high voltage generator vacuum tube and wherein said voltage rectifying system including a heater type diode having an anode and wherein there is additionally provided a load circuit for said diode, connections from said horizontal deflection signal generator to said diode-anode for rectifying a portion of the waveform produced by said horizontal deflection signal generator, connections from said diode heater to said vertical deflection signal generator for excitation of said diode heater from deflection signal energy produced by said vertical deflection signal generator, and electrical connections from said load circuit to said high voltage generator vacuum tube control grid such that the voltage developed across said diode load circuit by rectification of horizontal deflection signal energy acts to oppose said negative bias supply potential and establish proper operating conduction of said high voltage generator vacuum tube.

5. In a cathode ray deflection system, a vertical deflectin signal generator, a horizontal deflection signal generator, a first and second terminal for application of electron beam accelerating voltage for an associated cathode ray deflection device, a high voltage generator employing a vacuum tube having at least a cathode and a control grid, said high voltage generator having output terminals displaying a high unidirectional output potential in accordance with proper operation of said vacuum tube, a voltage rectifying system connected with at least one of said deflection generators for producing a unidirectional potential in accordance with deflection signals produced thereby, electrical connections connecting the output terminals of said high voltage generator in series aiding relationship with unidirectional potential produced by said voltage rectifying means and applying said series voltage to said first and second electron beam accelerating voltage terminals, and electrical connections applying said rectifying system unidirectional potential to the control grid-cathode circuit of said high voltage generator vacuum such that proper grid to cathode potential of said vacuum tube for proper operation thereof is established through the influence of the unidirectional potential produced by said voltage rectifying means whereby failure of at least one of the deflection generators to which said voltage rectifying means is connected will result in a reduction of potential applied to said electron beam accelerating terminals and disabling of said high voltage generator vacuum tube.

6. Apparatus according to claim 5 wherein said high voltage generator is of the radio frequency type and wherein there is additionally provided a negative bias supply connected with the control grid of said high voltage generator vacuum tube, said negative supply voltage being of sufficient magnitude to establish plate current cut-off in said vacuum tube and wherein said rectifying system unidirectional potential is coupled to the control grid cathode circuit of said high voltage generator vacuum tube with such polarity to oppose said negative bias supply voltage thereby establishing proper operating conduction of said vacuum tube during the normal development of said unidirectional potential by said voltage rectifying system.

7. Apparatus as defined in claim 5 wherein said voltage rectifying system includes a heater type diode having an anode, and wherein there are additionally provided connections from said horizontal deflection signal generator to said diode-anode for rectifying portion of the waveform normally produced by said horizontal deflection signal generator and connections from said diode heater to said vertical deflection signal generator to provide excitation of said heater from deflection signal energy normally produced by said vertical deflection signal generator.

8. Apparatus according to claim 5 wherein said high voltage generator is of the radio frequency type and wherein there is additionally provided a source of negative bias potential connected with said high voltage generator vacuum tube control grid, said negative bias potential being of sufficient magnitude to establish plate current cut-off in said high voltage generator vacuum tube and wherein said voltage rectifying system including a heater type diode having an anode and wherein there is additionally provided a load circuit for said diode, connections from said horizontal deflection signal generator to said diode-anode for rectifying a portion of the waveform produced by said horizontal deflection signal generator, connections from said diode heater to said vertical deflection signal generator for excitation of said diode heater from deflection signal energy produced by said vertical deflection signal generator, and electrical connections from said load circuit to said high voltage generator vacuum tube control grid such that the voltage developed across said diode load circuit by rectification of horizontal deflection signal energy acts to oppose said negative bias supply potential and establish proper operating conduction of said high voltage generator vacuum tube.

9. In an electrical interlocking system for a cathode ray tube high voltage system and beam deflection system, a vertical deflection signal generator, a horizontal deflection signal generator, a first terminal for application of cathode ray tube focusing electrode potential, a second terminal for application of cathode ray tube beam accelerating voltage, a high voltage generator employing a vacuum tube having at least a cathode, an anode, and a control grid, said generator having output circuit terminals disposed for dividing the high voltage generator output voltage into at least two parts, the overall output voltage of said generator being dependent upon proper operation of said vacuum tube, a voltage rectifier system connected with at least one of said deflection generators for producing a unidirectional potential in accordance with the deflection signal produced thereby, electrical connections placing said voltage rectifying system unidirectional potential in series aiding with the first part of said high voltage generator output voltage and applying the series voltage so obtained to said first terminal for utilization as focusing potential, electrical connections placing said voltage rectifying system unidirectional potential in series aiding with the total output of said high voltage generator and applying the series voltage so obtained to said second terminal for utilization as cathode ray accelerating potential, and electrical connections placing said voltage rectifying system unidirectional potential in series with the grid cathode circuit of said voltage generator vacuum tube such that proper grid to cathode potential for operation of said vacuum tube is established through the influence of said rectifying system unidirectional potential whereby failure of at least one of said deflection generators causes reduction in potential applied to said focusing electrode terminal and said accelerating electrode terminal through the disabling of said high voltage generator vacuum tube.

10. Apparatus according to claim 9 wherein said high voltage generator is of the radio frequency type and wherein there is additionally provided a negative bias supply connected with the control grid of said high voltage generator vacuum tube, said negative supply voltage being of sufficient magnitude to establish plate current cut-off in said vacuum tube and wherein said rectifying system unidirectional potential is coupled to the control grid cathode circuit of said high voltage generator vacuum tube with such polarity to oppose said negative bias supply voltage thereby establishing proper operating conduction of said vacuum tube only during the normal development of said unidirectional potential by said voltage rectifying system.

11. Apparatus as defined in claim 9 wherein said voltage rectifying system includes a heater type diode having an anode, and wherein there are additionally provided connections from said horizontal deflection signal generator to said diode anode for rectifying portion of the waveform normally produced by said horizontal deflection signal generator and connections from said diode heater to said vertical deflection signal generator to provide excitation of said heater from deflection signal energy normally produced by said vertical deflection signal generator.

12. Apparatus according to claim 9 wherein said high voltage generator is of the radio frequency type and wherein there is additionally provided a source of negative bias potential connected with said high voltage generator vacuum tube control grid, said negative bias potential being of sufficient magnitude to establish plate current cut-off in said high voltage generator vacuum tube and wherein said voltage rectifying system including a heater type diode having an anode and wherein there is additionally provided a load circuit for said diode, connections from said horizontal deflection signal generator to said diode-anode for rectifying a portion of the waveform produced by said horizontal deflection signal generator, connections from said diode heater to said vertical deflection signal generator for excitation of said diode heater from deflection signal energy produced by said vertical deflection signal generator, and electrical connections from said load circuit to said high voltage generator vacuum tube control grid such that the voltage developed across said diode load circuit by rectification of horizontal deflection signal energy acts to oppose said negative bias supply potential and establish proper operating conduction of said high voltage generator vacuum tube.

13. In a cathode ray device utilization apparatus, a vertical deflection signal generating system, a horizontal deflection signal generating system, a cathode ray device having a focusing electrode terminal and an accelerating electrode terminal, voltage rectifying means including a rectifier having a heater and an anode, means connecting said rectifier heater with said vertical deflection generator system for activation of said heater from energy derived from the output signal produced by said vertical deflection generator system, means connecting the anode of said voltage rectifier with said horizontal deflection signal generator system for producing a unidirectional output voltage from said voltage rectifying means which is dependent upon the proper operation of said horizontal deflection signal generator system and said vertical deflection signal generator system, a high voltage generator employing a vacuum tube having at least a cathode and a control grid, and terminal connections to the output circuit of said generator permitting its output voltage to be realized in at least two parts, the total output voltage of said generator being dependent upon proper operation of said vacuum tube, electrical connections placing said voltage rectifying means unidirectional output voltage in series aiding with the first part of said high voltage generator output voltage and connecting said series voltage to the cathode ray tube focusing electrode terminal, electrical connections placing said rectifying means unidirectional output voltage in series aiding with the total output voltage of said high voltage generator and applying said series voltage to said cathode ray tube accelerating electrode terminal, and electrical connections placing said voltage rectifying means output voltage in series with the grid cathode circuit of said high voltage generator vacuum tube such to maintain proper operation of said vacuum tube during the proper operation of said horizontal and vertical deflection signal generating systems whereby failure of said horizontal and vertical deflection signal generator system disables said high voltage generator vacuum tube and reduces the voltage applied to said cathode ray tube accelerating and focusing electrode terminals.

14. Apparatus according to claim 13 wherein said high voltage generator is of the voltage doubling R. F. type comprising in combination a high voltage radio frequency output transformer having at least a primary winding and a secondary high-tension winding, electrical connections placing said primary winding in series with said vacuum tube anode and a source of polarizing potential, means for establishing resonance of the primary winding at some operating frequency, coupling means from the anode circuit of said vacuum tube to the grid cathode circuit of said vacuum tube such to sustain oscillation of said vacuum tube circuit under normal operating conditions, an inductance having a tap thereon, connections placing the whole of said inductance in series with a first capacitance and a unidirectional conduction device across the secondary of said radio frequency transformer, and electrical connections placing another unilateral conduction device in series with a second capacitance from the tap on said inductance to the terminal of said inductance connected with said first capacitance, and wherein said electrical connections placing said voltage recifying system unidirectional potential in series aiding with the voltage developed by said high voltage generator includes a connection from said voltage rectifying system to the terminal defined by the connection of said second unilateral conduction device with said second capacitor.

15. In a high voltage power supply system incorporating a high tension winding having at least a first and second output terminal across which is developed an alternating voltage, a cascade voltage rectifying system for connection with said high tension winding comprising in combination, a first and second unilateral conduction device, an inductance having at least a first and second terminal, a first and second storage capacitor, connections placing said inductance, said first storage capacitor and said first unilateral conduction device in series across the output terminals of said high tension winding, connections placing said second unilateral conduction device and said second capacitor in series across a portion of said inductance, said connections being such that the unidirectional voltage developed across said second capacitor is in series additive relationship with the unilateral voltage developed across said first capacitor.

16. In a high voltage power supply system incorporating a high tension winding having at least a first and second output terminal across which is developed an alternating voltage, a cascade voltage rectifying system for connection with said high tension winding comprising in combination a first and second unilateral conduction device each having respectively an anode and a cathode, a first and second storage capacitor, an inductance having at least a first and second terminal, a connection from said first terminal of said high tension winding to the anode of said unilateral conduction device, a connection from the cathode of said unilateral conduction device to one terminal of said first condenser, a connection from the other terminal of said first condenser to the first terminal of said inductance, a connection between the second terminal of said inductance and the second terminal of said high tension winding, a connection from the cathode of said second unilateral conduction device to said inductance, and connections placing said second capacitor between said second unilateral conduction device anode and the first terminal of said inductance whereby a unidirectional voltage may be realized between the cathode of said first unilateral conduction device and the anode of said second unilateral conduction device, the value of unidirectional voltage being at least the sum of the unidirectional voltages developed across said first and second capacitors.

17. Apparatus according to claim 16 wherein said inductance and said first capacitance are selected to be substantially series resonant at the frequency of the alternating voltage developed across said high tension winding terminals.

ROBERT K. LOCKHART.

REFERENCES CITED

The following references are of record in the file of this patent:

UNITED STATES PATENTS

| Number | Name | Date |
|---|---|---|
| 2,222,426 | White et al. | Nov. 19, 1940 |
| 2,258,370 | Taylor et al. | Oct. 7, 1941 |
| 2,261,645 | Delvaux | Nov. 4, 1941 |
| 2,397,150 | Lyman | Mar. 26, 1946 |
| 2,444,902 | Torsch | July 6, 1948 |